United States Patent
Kobayashi et al.

(10) Patent No.: US 6,870,994 B2
(45) Date of Patent: Mar. 22, 2005

(54) OPTICAL FIBER CORD, MANUFACTURING METHOD THEREOF, AND MANUFACTURING APPARATUS THEREOF

(75) Inventors: Kazunaga Kobayashi, Chiba (JP); Masahiro Kusakari, Chiba (JP); Takeshi Honjyou, Chiba (JP); Keiji Ohashi, Chiba (JP)

(73) Assignee: Fujikura Ltd., Tokyo (JP)

( * ) Notice: Subject to any disclaimer, the term of this patent is extended or adjusted under 35 U.S.C. 154(b) by 59 days.

(21) Appl. No.: 10/207,899

(22) Filed: Jul. 31, 2002

(65) Prior Publication Data

US 2003/0165308 A1 Sep. 4, 2003

(30) Foreign Application Priority Data

Mar. 1, 2002 (JP) ......................................... 2002-055793

(51) Int. Cl.[7] .................................................. G02B 6/44
(52) U.S. Cl. ........................ 385/102; 385/100; 385/106
(58) Field of Search ................................. 385/100, 102, 385/106

(56) References Cited

U.S. PATENT DOCUMENTS

| | | | | |
|---|---|---|---|---|
| 4,042,436 A | * | 8/1977 | Sundberg et al. | ........... 156/182 |
| 5,114,658 A | * | 5/1992 | Katsaros | ..................... 264/537 |
| 5,126,167 A | * | 6/1992 | Matsuno et al. | ......... 427/163.2 |
| 5,440,095 A | * | 8/1995 | Yoshie et al. | .......... 219/121.63 |
| 5,721,177 A | * | 2/1998 | Frank | .......................... 442/59 |
| 6,371,749 B2 | * | 4/2002 | Thompson et al. | ......... 425/363 |
| 6,383,432 B1 | * | 5/2002 | Nakajima et al. | ........ 264/210.7 |
| 6,417,445 B1 | * | 7/2002 | Sato et al. | .................... 174/36 |
| 6,488,879 B1 | * | 12/2002 | Moriyasu et al. | ........... 264/255 |
| 2003/0142938 A1 | * | 7/2003 | Koyano et al. | ............. 385/123 |

\* cited by examiner

Primary Examiner—John D. Lee
Assistant Examiner—Tina M Lin
(74) Attorney, Agent, or Firm—Oblon, Spivak, McClelland, Maier & Neustadt, P.C.

(57) ABSTRACT

The manufacturing apparatus for optical fiber cord is provided with an extrusion machine, a cooling chamber, an intermediate pulling device, a heating chamber, a final pulling device, and a winding machine wherein the machines, the devices and the chambers are disposed in this order. One or more optical fiber cores and one or more reinforcing fibers are sheathed with thermoplastic resin by the extrusion machine. The thermoplastic resin is solidified by cooling so as to be a resin sheath. The sheathed fibers are annealed by the heating chamber so that its residual stress is relieved.

16 Claims, 4 Drawing Sheets

FEEDING DIRECTION

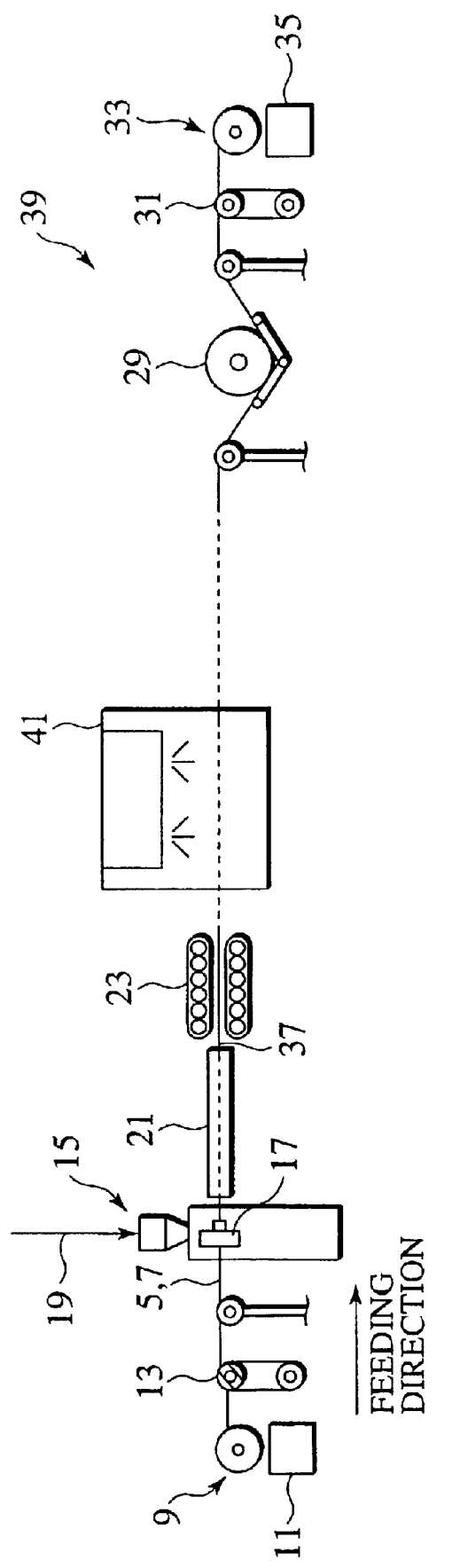

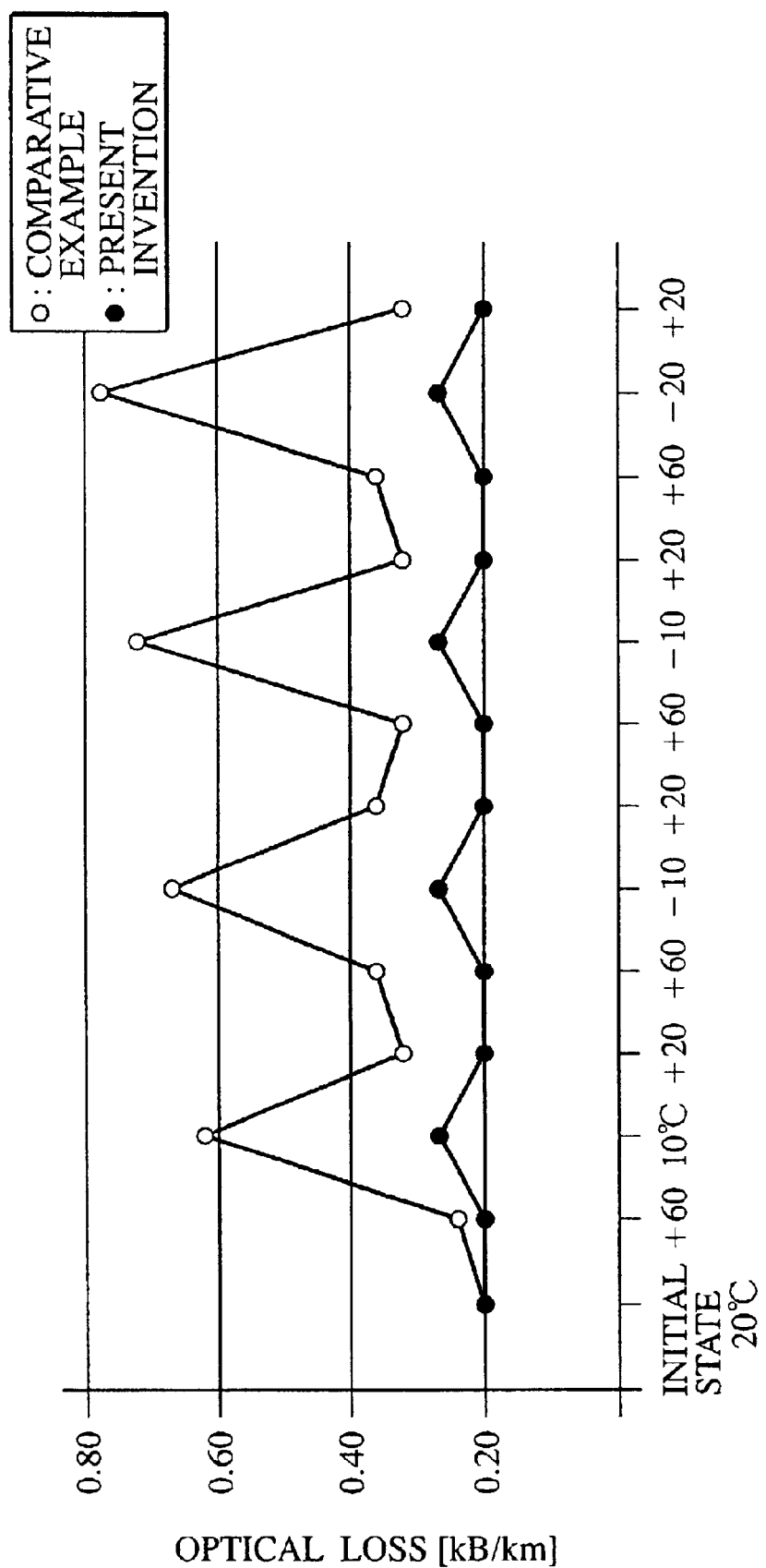

OPTICAL FIBER CORD, MANUFACTURING METHOD THEREOF, AND MANUFACTURING APPARATUS THEREOF

BACKGROUND OF THE INVENTION

1. Field of the Invention

The present invention relates to an optical fiber cord, a manufacturing method thereof and manufacturing apparatus thereof and, more particularly, to an optical fiber cord of reduced deterioration of optical loss characteristic originating from residual stress, a manufacturing method thereof and manufacturing apparatus thereof.

2. Description of the Related Art

There is proposed an optical fiber cord provided with an optical fiber core in the center, reinforcing fibers running in parallel thereto and a resin sheath covering them.

The proposed optical fiber cord is produced as follows. One or more reinforcing fibers are disposed around an optical fiber core and the surrounding thereof is covered with thermoplastic resin being heated. These are extruded with an extrusion machine and cooled in a cooling chamber, so that the aforementioned thermoplastic resin is hardened so as to produce a resin sheath. The optical fiber cord is wound up by a winding machine and a production is finished.

SUMMARY OF THE INVENTION

According to the proposed optical fiber cord described above, residual distortion is generated between the resin sheath and the optical fiber cord when it is extruded or cooled. If this phenomenon is kept as it is for long time, or if the same optical fiber cord is repeatedly subjected to heat processing, the resin sheath is contracted so that the residual distortion is released. At this time, the optical fiber cord is slightly deformed thereby increasing optical loss.

Upon actual use, usually, the optical fiber cord is cut to about several meters and then a connector is attached to an end of the optical fiber cord. In this case, if the cord is contracted, a problem occurs in the attachment of the connector and if the optical fiber is bent near a portion where the connector is attached, the optical loss further increases.

The present invention has been achieved to solve the above-described problem and an object of the present invention is to provide an optical fiber cord of reduced deterioration of optical loss characteristic originating from residual stress, a manufacturing method thereof and manufacturing apparatus thereof.

A manufacturing method for optical fiber cord includes, (1) sheathing one or more optical fiber cores and one or more reinforcing fibers running in parallel thereto with thermoplastic resin by extrusion; (2) solidifying the thermoplastic resin so as to be a resin sheath by cooling; and (3) annealing the optical fiber cores, the reinforcing fibers and the resin sheath.

The manufacturing apparatus for optical fiber cord is provided with an extrusion machine, a cooling chamber, an intermediate pulling device, a heating chamber, a final pulling device, and a winding machine wherein the machines, the devices and the chambers are disposed in this order. The aforementioned cooling step is executed with a cooling chamber, which stores cooling water. The aforementioned annealing step is executed with a heating chamber storing steam or hot water, or a heating chamber provided with a device for Irradiating with infrared ray.

The optical fiber cores and the reinforcing fibers are covered with the resin sheath in such an easy process. A residual stress generated in the optical fiber cord is relieved by annealing. As a result, even if it is left for a long time or subjected to heat processing, the resin sheath does not contract and the optical loss will not increase, thereby keeping an excellent characteristic.

Preferably, the manufacturing apparatus further includes a re-cooling chamber disposed in the downstream of the heating chamber and in the upstream of the final pulling device and thereby the optical fiber cord is re-cooled. Consequently, the optical fiber cord is cooled sufficiently before it is introduced into the final pulling device and therefore, no residual stress is generated in a subsequent process.

BRIEF DESCRIPTION OF THE DRAWINGS

FIG. 3 is a schematic view of an optical fiber cord manufacturing apparatus according to a second embodiment of the present invention; and FIG. 4 is a diagram indicating comparison of the optical fiber cord according to the first embodiment of the present invention with a comparative example in viewpoints of loss characteristic of the optical fiber cord after heat cycle is executed.

DETAILED DESCRIPTION OF THE PREFERRED EMBODIMENT

Figure 1:
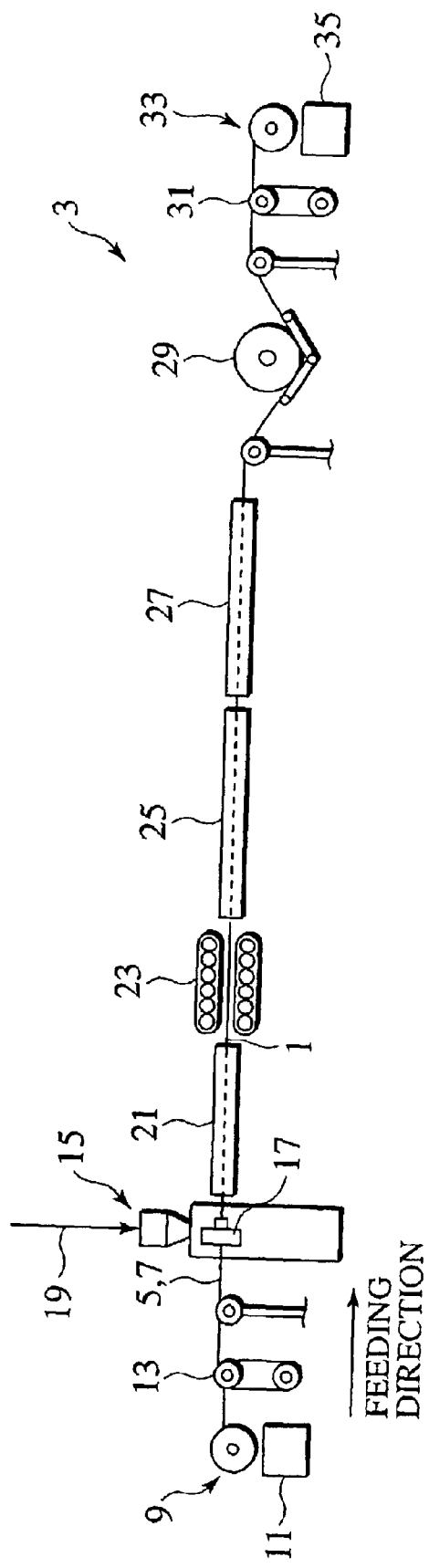
FIG. 1 is a schematic view of an optical fiber cord manufacturing apparatus according to a first embodiment of the present invention.

An optical fiber cord, manufacturing apparatus thereof and manufacturing method thereof according to a first embodiment of the present invention will be described hereinafter with reference to FIG. 1.

A manufacturing apparatus 3 for an optical fiber cord 1 includes plural feeding reels 11 and a feeding machine 9 (not shown) provided with plural motors. An optical fiber core 5 (a main body of the optical fiber, to which either a single-core fiber or a tape-like fiber having plural cores may be applied.) and a plurality of reinforcing fibers 7 are wound around the feeding reels 11. The manufacturing apparatus 3 includes a tension control dancer 13 disposed in the downstream of the feeding machine 9 and an extruding means, which is an extruder 15 having die 17 according to this embodiment, disposed in a further downstream.

The optical fiber core 5 and the reinforcing fibers 7 are fed out from the respective feeding reels driven by the motors and their tensions are adjusted by the tension control dancers 13, so that both of them are introduced into the die 17 in almost parallel state. On the other hand, thermoplastic resin molten by heating is poured into the die 17, so that it covers the optical fiber cord 5 and the reinforcing fibers 7 so as to be a resin sheath 19. The cross-sectional structure of the optical fiber cord 1 of the present invention, shown in FIGS. 2A, 2B is formed in this way.

As thermoplastic resin applied to the resin sheath 19, poly-vinyl chloride (PVC), polyolefin base resin, polyamide base resin and the like are preferable.

Figure 2A:
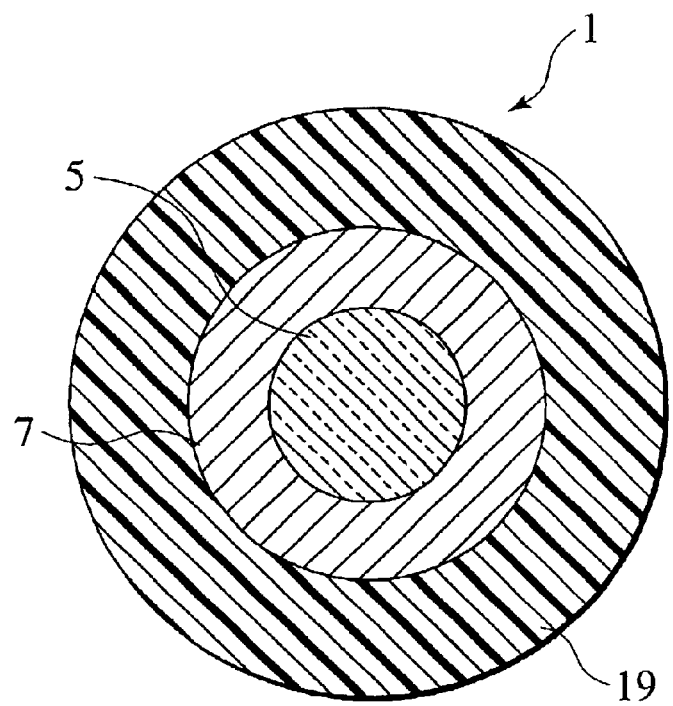
FIG. 2A is a cross-sectional view of a single-core optical fiber cord according to an embodiment of the present invention.

FIG. 2A shows a preferred example of a single-core optical fiber cord 1, which can be produced with the above-described manufacturing apparatus, comprising the optical fiber core 5, four reinforcing fibers 7 surrounding the same and the resin sheath 19 which surrounds the periphery of the reinforcing fibers 7. Preferably, the external diameter of the optical fiber core 5 is 0.5 to 0.9 mmφ and the external diameter of the resin sheath 19 is 2 to 3 mmφ. More preferably, the external diameter of each thereof is 0.9 mmφ, 2.8 mmφ.

Figure 2B:
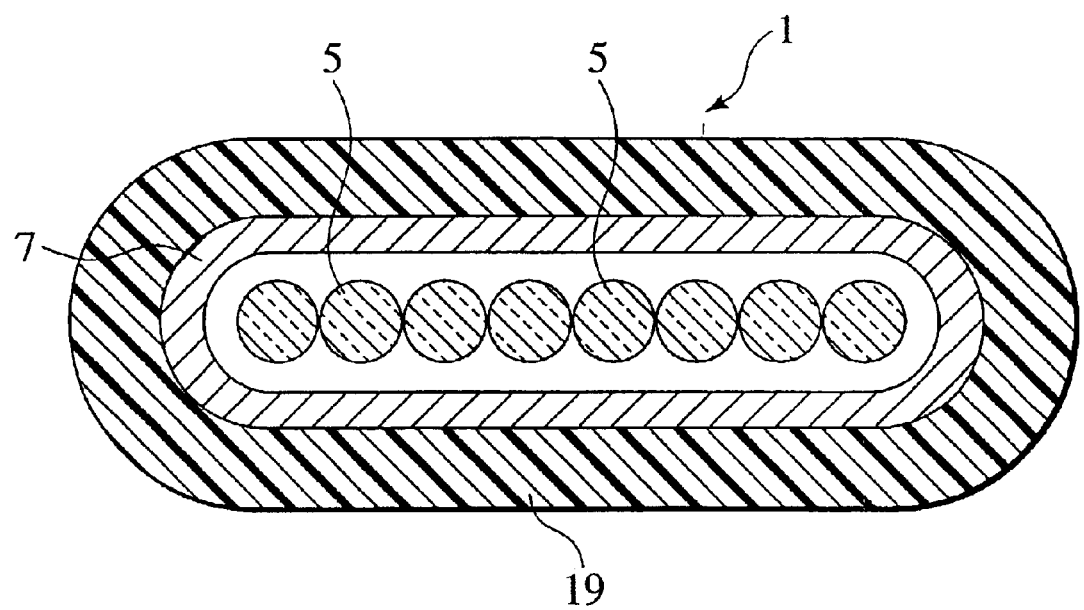
FIG. 2B is a cross-sectional view of a tape-like optical fiber cord according to an embodiment of the present invention.

FIG. 2B shows a preferred example of the tape-like optical fiber cord 1, comprised of two to twelve optical fiber cores 5 and resin sheath 19 formed in the form of a tape in which the thickness of its external configuration is about 2 mm and the width thereof is about 2 to 5 mm.

The manufacturing apparatus 3 is provided with a solidifying means in the downstream of the aforementioned extruding means, which is a cooling chamber 21 reserving cooling water according to this embodiment. The extruded optical fiber cord 1 is cooled when it passes through the cooling chamber 21, so that the resin sheath 19 is solidified. Because the resin sheath 19 is desired to be solidified before an next step of intermediate pulling, the temperature of the cooling water in the cooling chamber 21 is preferred to be below 60° C. and the cooling time is preferred to be less than 0.5 seconds. More preferably, the temperature is below 30° C. and the cooling time is less than 1 second. However, in this case, it is preferred that only the resin sheath 19 is solidified while the optical fiber core 5 inside is still in a loose state.

The optical fiber cord 1 in a state that only resin sheath 19 is solidified is pulled up by an intermediate pulling device 23 shown in FIG. 1 and introduced to a heating processing process disposed further in the downstream.

There is provided a heating processing means, which is a heating chamber 25 according to this embodiment, in the downstream of the intermediate pulling device 23. The optical fiber cord 1 is exposed to steam or hot water in the heating chamber 25, so that the resin sheath 19 is annealed. Preferably, the annealing temperature is 60° C. or more and the time is more than a second, more preferably the temperature is 80° C. or more.

There is provided are-cooling means, which is are-cooling chamber 27 reserving cooling water according to this embodiment, further in the down stream of the heating chamber 25. The annealed optical fiber cord 1 is introduced into the re-cooling chamber 27 and cooled again. Preferably, the re-cooling temperature is 30° C. or less and the time is more than a second.

After re-cooling, the optical fiber cord 1 is pulling by a final pulling machine 29. The intermediate pulling machine 23 and the final pulling machine 29 are so controlled to adjust pulling speed and torque, so that tension applied to the optical fiber cord 1 is optimum. The tension is desired to be adjusted so that only the resin sheath is contracted freely while the optical fiber core 5 is not contracted. Preferably, the tension is less than 50 g and kept to be relatively high.

A tension control dancer 31 and a winding machine 33 are provided in the most down stream of the manufacturing apparatus. After the tension is adjusted by the tension control dancer, the optical fiber cord 1 is wound up around a winding reel 35 by the winding machine 33 driven by a motor (not shown).

According to the manufacturing process of the optical fiber cord 1 of the first embodiment of the present invention, its entire process from the feeding reel 1 up to the winding reel 35 is carried out with such an in-line equipment of the manufacturing apparatus 3.

Next, the manufacturing apparatus and method for the optical fiber cord according to the second embodiment of the present invention will be described hereinafter with reference to FIG. 3. In the following description, identical reference numerals are assigned to the same components as the first embodiment and description thereof is omitted while only different components will be described with new reference numerals.

Resins whose annealing temperature needs to be higher than 150° C. are preferably applied to the resin sheath 19 of the optical fiber cord 37 according to this embodiment, such nylon, polycarbonate, polyvinylidene fluoride. PVC or polyolefin may be applied without problems.

The manufacturing apparatus 39 of the optical fiber cord 37 is provided with an infrared ray irradiating unit 41 as its heating processing means. The optical fiber cord 37 drawn from the intermediate pulling device 23 is introduced into the infrared ray irradiating unit 41 and exposed to infrared ray so that it is annealed. The wavelength of infrared ray to be irradiated is about 3 to 15 μm and the annealing is carried out at temperatures 150° C. or more to less than 250° C.

No re-cooling means is provided in the down stream of the infrared ray irradiating unit 41 unlike the first embodiment. The heated optical fiber cord 37 is cooled gradually under the room temperature. Of course, it is permissible to provide with a re-cooling means so as to execute cooling positively.

Like the first embodiment, after cooled gradually, the optical fiber cord 37 is pulling up by the final pulling machine 29 while its tension is being adjusted, and after that tension is adjusted by the tension control dancer 31, it is wound up around the winding reel 35 by the winding machine 33.

According to the manufacturing process of the optical fiber cord 37 of the second embodiment of the present invention, its entire process from the feeding reel 1 up to the winding reel 35 is carried out with such an in-line equipment of the manufacturing apparatus 39.

The optical fiber cord of the first embodiment of the present invention will be compared with the comparative example in terms of optical loss characteristic as follows. The optical fiber cord of the comparative example is produced according to the same manufacturing method as the proposed optical fiber described former. The manufacturing method of the comparative example differs from the manufacturing method of the present invention in that the former does not include the intermediate pulling process, heating processing process and re-cooling process.

Each the optical fiber cords of the embodiment and comparative example comprises an optical fiber core made of nylon of SM 0.9 mmφ, four reinforcing fibers composed of 1420 denier Kabler and a resin sheath composed of flame retardant polyolefin having a relatively large contraction and an external diameter of 2.8 mmφ.

The optical fiber cords of the embodiment and comparative example were subjected to three heating cycles of from 20° C. →60° C.→-10° C.→20° C. and transient optical loss characteristic during that period was evaluated. As shown in FIG. 4, initial optical losses before heating, which the optical fiber cord of the embodiment and the comparative example had, were 0.20 dB/km. Although in the comparative example, after it was heated at a high temperature of 60° C., its optical loss increased by about 0.5 dB/km when it was placed under low temperatures, the same optical loss did not change in case of the embodiment.

The contents of Japanese Patent Application No. 2002-55793 (filed Mar. 1, 2002) are incorporated herein by reference in its entirety.

Although the invention has been described above by reference to certain embodiments of the invention, the invention is not limited to the embodiments described above. Modifications and variations of the embodiments described above will occur to those skilled in the art, in light of the above teachings.

What is claimed is:

1. A manufacturing method for optical fiber cord, comprising:
    (1) sheathing one or more optical fiber cores and one or more reinforcing fibers running in parallel thereto with thermoplastic resin by extrusion;
    (2) solidifying the thermoplastic resin by cooling; and
    (3) annealing the optical fiber cores, the reinforcing fibers and the thermoplastic resin sheath.

2. The manufacturing method for optical fiber cord according to claim 1, further comprising:
    re-cooling the optical fiber cord just after the annealing step.

3. The manufacturing method for optical fiber cord according to claim 1, wherein:
    the annealing step is executed with hot water or heated steam.

4. The manufacturing method for optical fiber cord according to claim 1, wherein:
    the annealing step is executed by irradiating infrared ray and heating temperature is between 150° C. and 250° C.

5. A manufacturing apparatus for optical fiber cord comprising:
    an extrusion machine configured to extrude one or more optical fiber cores, one or more reinforcing fibers, and a thermoplastic resin so as to cover the optical fiber cores and the reinforcing fibers with a sheath made of the thermoplastic resin;
    a cooling chamber disposed in the downstream of the extrusion machine;
    an intermediate pulling device disposed in the downstream of the cooling chamber;
    a heating chamber disposed in the downstream of the intermediate pulling device;
    a final pulling device disposed in the downstream of the heating chamber; and
    a winding machine disposed in the downstream of the final pulling machine.

6. The manufacturing apparatus for optical fiber cord according to claim 5, further comprising:
    a re-cooling chamber disposed in the downstream of the heating chamber and in the upstream of the final pulling device.

7. The manufacturing apparatus for optical fiber cord according to claim 5, wherein:
    the heating chamber is a chamber for storing hot water or heated steam.

8. The manufacturing apparatus for optical fiber cord according to claim 5, wherein:
    the heating chamber comprises an infrared ray heater.

9. An optical fiber cord comprising:
    one or more optical fiber cores and one or more reinforcing fibers running in parallel thereto and a resin sheath covering the optical fiber cores and the reinforcing fibers;
    wherein the resin sheath is formed by extrusion-forming the optical fiber cores and the reinforcing fibers with thermoplastic resin, solidifying the thermoplastic resin by cooling after the extrusion-forming and annealing after the solidifying.

10. An optical fiber cord comprising:
    one or more optical fiber cores and one or more reinforcing fibers running in parallel thereto and a resin sheath covering the optical fiber cores and the reinforcing fibers;
    wherein the resin sheath is formed by extrusion-forming the one or more optical fiber cores and the one or more reinforcing fibers with thermoplastic resin, solidifying the thermoplastic resin by cooling after the extrusion-forming and annealing after the solidifying such that an optical loss of the optical fiber cord is 0.2 dBkm or less after annealing and cooling.

11. The manufacturing method according to claim 3, wherein:
    the heating step is executed at 60° C. or higher for one second or more.

12. The manufacturing method according to claim 3, wherein:
    the heating step is executed at 80° C. or higher for one second or more.

13. The manufacturing apparatus according to claim 5, wherein:
    the intermediate pulling device is so controlled as to apply tension to the optical fiber cord so that the resin sheath is freely contracted while the optical fiber cores are not contracted.

14. The manufacturing apparatus according to claim 5, wherein:
    the heating chamber is so configured as to heat the optical fiber cord to 60° C. or higher for one second or more.

15. The manufacturing apparatus according to claim 5, wherein:
    the heating chamber is so configured as to heat the optical fiber cord beyond 80° C. or higher for one second or more.

16. The manufacturing apparatus according to claim 8, wherein:
    the infrared ray heater is so configured as to be capable of increasing heating temperature thereof between 150° C. and 250° C.

* * * * *